July 12, 1927.  W. R. SOMMER ET AL  1,635,293

WIRE CONNECTER

Filed Oct. 8, 1923   3 Sheets-Sheet 1

Wm. R. Sommer
Roelof Ree
C. Kerkhof   INVENTORS

BY Victor J. Evans
ATTORNEY

WITNESS:

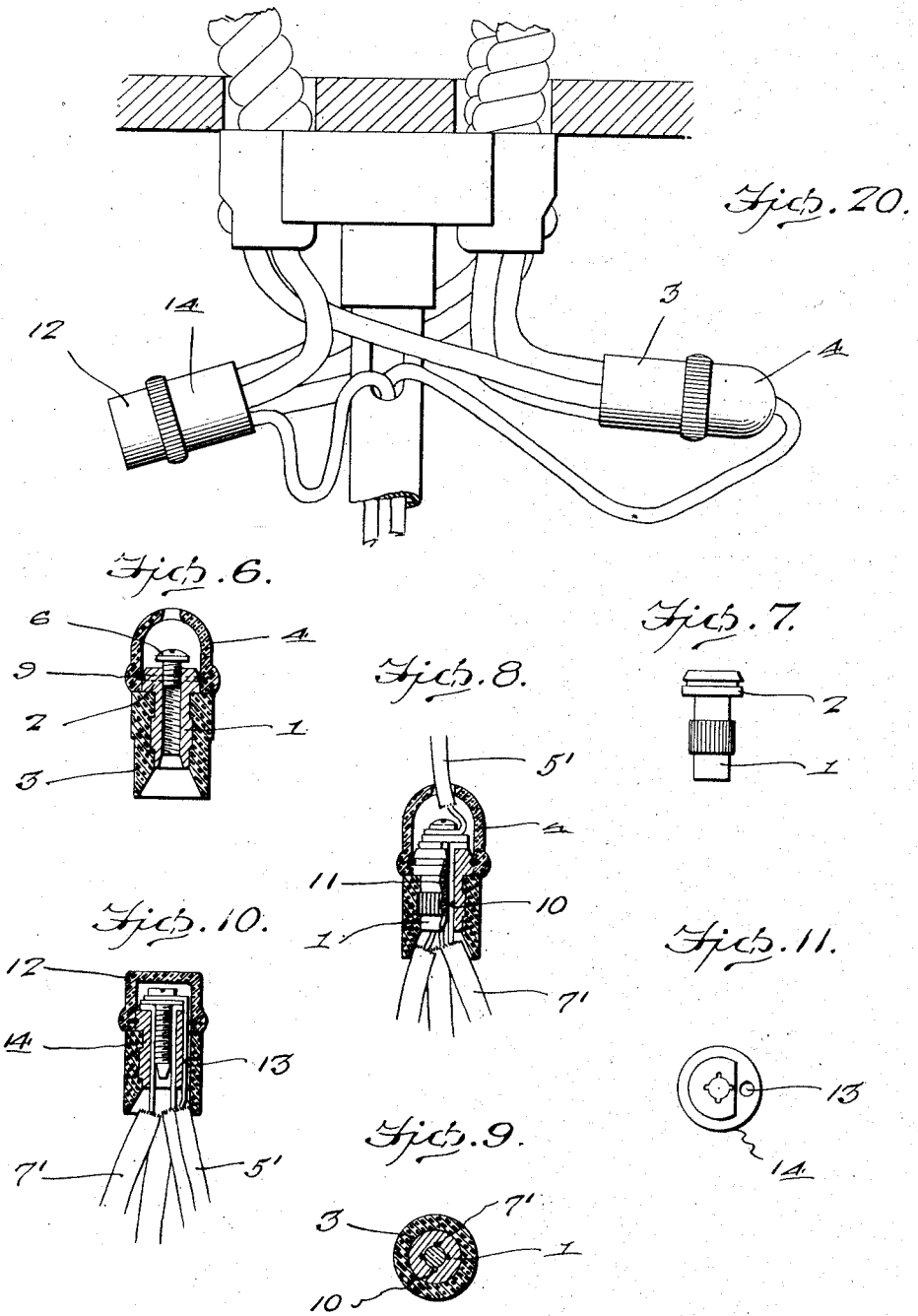

July 12, 1927.
W. R. SOMMER ET AL
1,635,293
WIRE CONNECTER
Filed Oct. 8, 1923
3 Sheets-Sheet 3
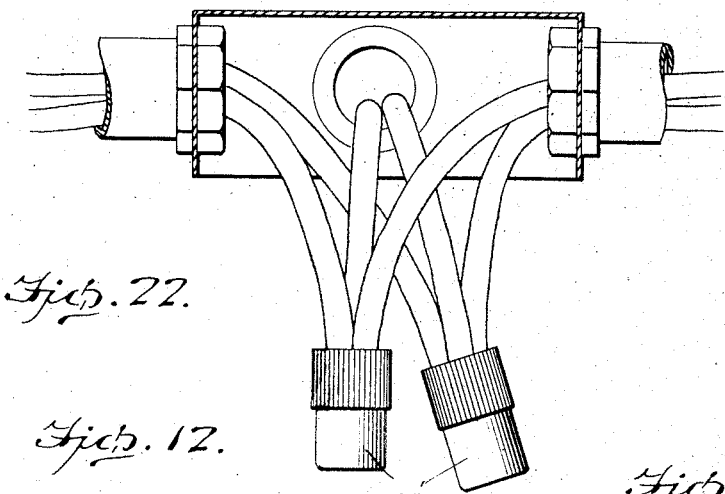
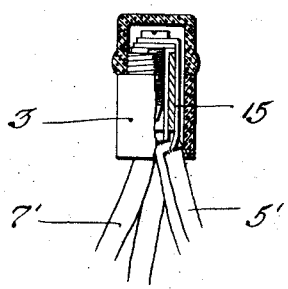
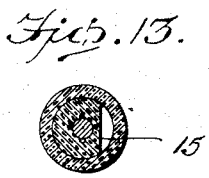
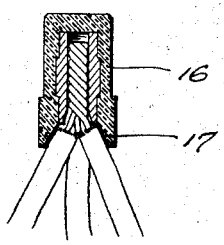
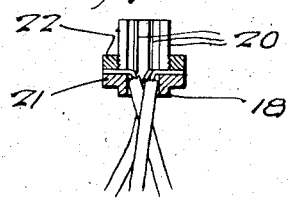
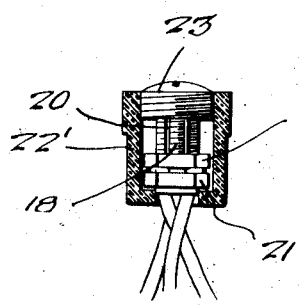
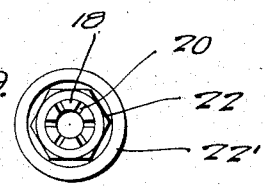
Wm R. Sommer
Roelof Ree
C. Kernhof   INVENTORS
BY Victor J. Evans
WITNESS   ATTORNEY Patented July 12, 1927.

1,635,293

UNITED STATES PATENT OFFICE.

WILLIAM R. SOMMER, ROELOF REE, AND CORNELUS KERKHOF, OF HACKENSACK, NEW JERSEY, ASSIGNORS TO JIFFY WIRE CONNECTOR COMPANY, OF HACKENSACK, NEW JERSEY, A CORPORATION OF NEW JERSEY.

WIRE CONNECTER.

Application filed October 8, 1923. Serial No. 667,408.

This invention relates to new and improved wire connecters for electrical and other purposes.

One of the objects is to provide a connecter to securely connect two or more wires together for current light or other purposes.

A further object of the invention is to provide a connecter which can be manufactured cheaply and will be far safer to use than the method of soldering and taping the wires, as generally used for making a connection.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figures 6 and 7 are views of a slight modification.

Figure 8 is a sectional view of another modification.

Figure 9 is a transverse sectional view through this form.

Figures 10 and 11 are views of another form.

Figures 12 and 13 are views of another form.

Figures 14, 15 and 16 are views of another form.

Figures 17, 18 and 19 are views of a further modification.

Figures 20, 21, 22 and 23 are views showing the application of the invention.

Figure 1:
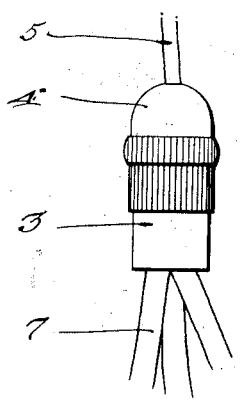
Figure 1 is an elevation showing one form of the invention.
Figure 2:
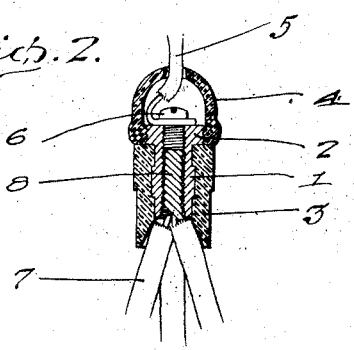
Figure 2 is a sectional view thereof.
Figure 3:
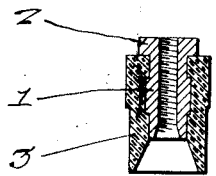
Figures 3, 4 and 5 are detail views of this form.
Figure 4:
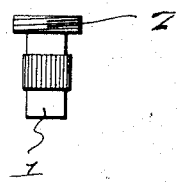
Figure 5:
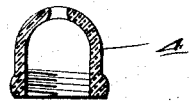

Referring to Figures 1 to 5, 1 indicates a threaded sleeve which is formed of metal and which has a head 2 thereon. This sleeve is embedded in a composition body 3. The head is screw threaded to receive a composition cap 4. The conductor 5 is passed through the cap and is connected with the sleeve by the screw 6 and then the conductors 7 which are to be connected with the conductor 5 have their ends stripped of insulation and twisted together as shown at 8 and then these twisted ends are threaded into the sleeve which acts to hold them in place and also to electrically connect them with the conductor 5.

In the form shown in Figures 6 and 7, the cap is held to the sleeve by a split ring 9 which engages grooves in the head and cap.

In the form shown in Figures 8 and 9, the sleeve is provided with grooves 10 in its bore and the stripped ends of the conductors 7' are placed in these grooves and a long screw 11 is used to hold the conductor 5' in place and this screw will engage the ends of the conductors 7 so as to hold them in the sleeve. In other respects this form of the invention is similar to that above described.

In the form shown in Figures 10 and 11, the cap 12 is made solid and the upper conductor is passed upwardly through a hole 13 formed in the composition body 14.

In the form shown in Figures 12 and 13, the sleeve is provided with a flat side 15 to form a space to receive the upper conductor so that the hole in the composition body shown in Figures 10 and 11 is not required. Figures 12 and 13 show the cap as being screwed to the sleeve instead of being held thereon by the split ring, as shown in Figures 10 and 11.

In the form shown in Figures 15, 14 and 16, the composition body 16 has a closed end for covering the sleeve so that a cap is not necessary and the head on the sleeve is also omitted. The open end of the body is flared, as shown at 17 so as to receive the ends of the conductors and thus make a neat appearance. The twisted ends of the conductors are threaded into the sleeve as in the first form of the invention.

In Figures 17, 18 and 19, the sleeve 18 is provided with slots 20 instead of being interiorly threaded so that the ends of the wires after being stripped are passed through these slots and engage a flange 21 formed on the sleeve adjacent the bottom thereof, the upper edge of which is in alignment with the bottom of the slots. A nut 22 is then threaded on the sleeve for clamping the ends of the conductors between itself and the flange.

The sleeve is then placed in the composition body 22 which has an opening in its bottom through which the conductors pass and which has its upper end closed by a threaded plug 23.

Where the screw is used for holding the stripped end of the conductors in the grooves of the sleeves, the threads of the screw will cut into the ends and thus make a perfect contact. The object of providing holes or spaces for the lamp cord as in Figures 10, 11, 12 and 13, is to prevent the screw threads from cutting the twisted wire from which the cord is made.

Figure 21:
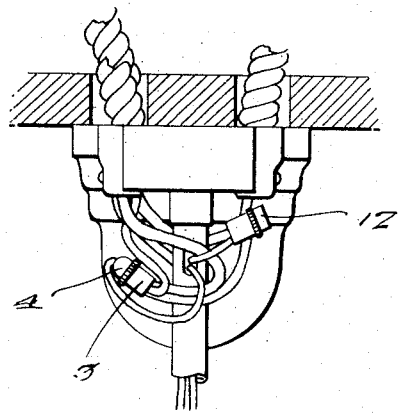
Figure 23:
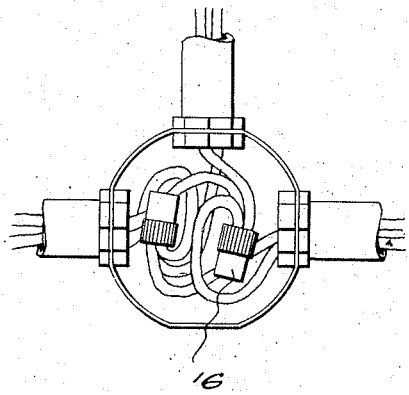

Figures 20, 21, 22 and 23 show how the invention can be used for connecting conductors together, these figures showing some of the uses to which the invention can be put.

These conductors can be used whenever a wire connection is to be made. A connection can be made very quickly with this connecter and it eliminates the danger of fire when making wire connections in places such as gasoline station pumps, between ceilings and walls, or anywhere where a hot soldering iron or blow torch would be dangerous. They save time and labor, are cheaper to install, safe, require no experience, eliminate all danger of short circuit and make a perfect connection.

It is thought from the foregoing description that the advantages and novel features of the invention will be readily apparent.

We desire it to be understood that we may make changes in the construction and in the combination and arrangement of the several parts, provided that such changes fall within the scope of the appended claim.

Having described the invention, we claim:—

A connecter comprising a continuous cylindrical member having an internally threaded straight bore extending therethrough, a collar formed on the exterior of said member intermediate its ends, and a hollow body of insulating material having an open end, the inner wall adjacent said end being beveled, said member being embedded in said body and terminating at said beveled wall, whereby the bare ends of a plurality of wires may be bunched and electrically connected together upon their insertion in said threaded bore and upon rotation of the device with respect to the wires.

In testimony whereof we hereby affix our signatures.

WILLIAM R. SOMMER.
ROELOF REE.
CORNELUS KERKHOF.